3,281,949
FREEZE DRYING APPARATUS AND METHOD
Reuben K. Tyson, Abington, Pa., assignor to Pennsalt Chemical Corporation, Philadelphia, Pa., a corporation of Pennsylvania
Filed July 6, 1964, Ser. No. 380,524
8 Claims. (Cl. 34—5)

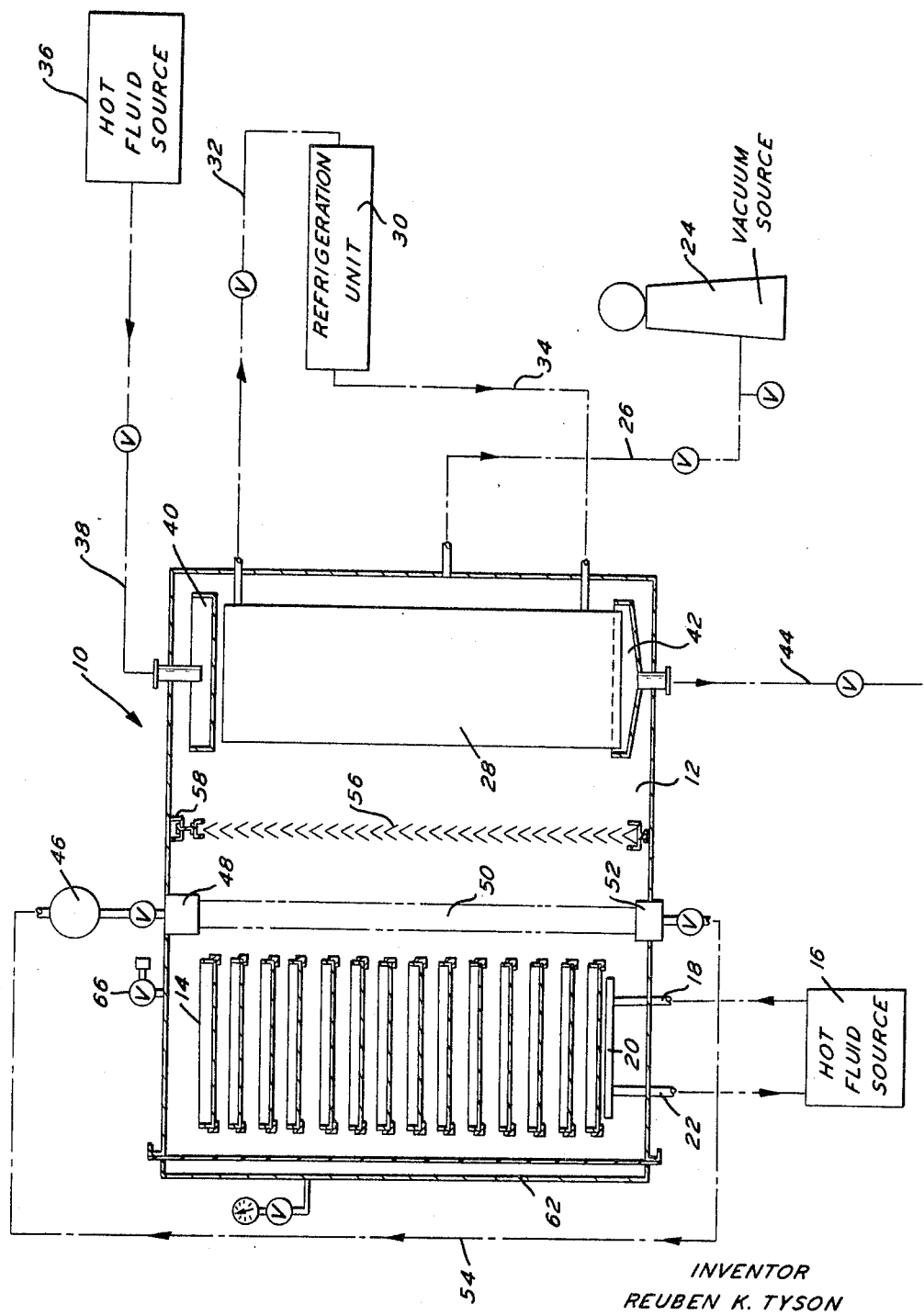

This invention relates to an improved freeze drying apparatus and method.

Industry is making wide use of freeze drying techniques and vacuum drying techniques in the preparation of many products. Freeze drying is being utilized for the processing of many articles such as extracts, citrus juices, meats, milk, blood, bones, etc., so that they may be stored indefinitely without refrigeration. Modern processing of such articles is being accomplished without impairment or loss of natural flavor, vitamin content or quality.

In a freeze drying process, articles to be freeze dried are frozen and then placed within a hermetically sealed enclosure. Means are provided to heat the articles to be freeze dried while they are subjected to a reduced pressure thereby causing ice within the frozen articles to sublime. The moisture evolved by sublimation of the ice is withdrawn and passed to a condenser. The moisture vapors condense on the condenser coils and form ice.

This invention provides a novel defrost system for melting accumulated ice on the condenser coils of the freeze drying apparatus.

Accordingly, it is an object of this invention to provide an improved method and apparatus for freeze drying.

A further object of this invention is to provide a novel method and apparatus for defrosting the condenser coils in the freeze drying apparatus.

A still further object of this invention is to provide an improved apparatus and method for increasing the efficiency of the condenser by minimizing its refrigeration load during the freeze drying operation and to increase the efficiency of the novel defrost system employed in the freeze drying apparatus.

Other objects will appear from the disclosure which follows hereinafter.

For the purpose of illustrating the invention, there is shown in the drawings a form which is presently preferred; it being understood, however, that this invention is not limited to the precise arrangements and instrumentalities shown.

The single figure in the drawing is a diagrammatic view of the freeze drying apparatus employed in the present invention.

Referring now to the drawing in detail, wherein like elements are indicated by like numerals, the freeze drying apparatus of the present invention is generally designated by the numeral 10.

The apparatus 10 includes a hermetically sealed chamber 12 including a door 62 at one end. Supported within the chamber 12 are a plurality of freeze drying shelves 14 arranged in a vertical array. The products to be freeze dried are adapted to be supported by the shelves 14.

A hot source of fluid 16 such as steam is connected by means of an inlet conduit 18 to a heating means 20 disposed beneath each shelf 14. The heating means 20 is conventional and includes a plurality of heating coils. The hot fluid is circulated through the heating coils within the heating means 20 and returned to the hot fluid source 16 by means of an outlet conduit 22. Although one heating means 20 is shown, it should be understood that a similar heating means is disposed beneath each of the freeze drying shelves 14.

Connected to the chamber 12 by means of a vacuum line 26 is a vacuum source 24. The chamber 12 is adapted to be evacuated by the source 24.

The products to be freeze dried are first frozen and placed upon the shelves 14. The pressure within the chamber 12 and the temperature produced by the heating means 20 is such that the ice within the frozen products will sublime. That is, the ice will pass directly from a solid state to a vapor state. The water vapor evolved by the sublimation of the ice is adapted to be condensed by a condenser 28 within the chamber 12.

The condenser coils of the condenser 28 are connected to a refrigeration unit 30 by means of a refrigerant inlet line 34 and a refrigerant outlet line 32. The refrigerant unit 30 is adapted to pump a suitable coolant through the line 34, condenser coils, and line 32. The moisture in the chamber 12 will condense and freeze in the form of ice on the coils of the condenser 28.

The ice formed on the condenser coils of the condenser 28 must be melted after each freeze drying cycle. Otherwise, the condenser will be insulated by an ice coating and will not be able to operate effectively.

Accordingly, a weir 40 is mounted within the chamber 12 above the condenser 28. The weir is connected by a hot fluid inlet line 38 to a hot fluid source 36. A hot fluid, preferably a liquid, such as water or glycol is fed to the weir 40 and cascaded by the weir over the vertically arranged condensing coils of the condenser 28. Ice collected on the coils of the condenser 28 is melted by direct contact with the evenly distributed hot liquid. The melted ice and hot liquid is caught in a drain pan 42 disposed beneath the condenser 28. The drained liquid leaves the chamber 12 through a drain conduit 44 connected to the drain pan 42.

The condenser 28 is adapted to be defrosted between each freeze drying cycle. Accordingly, the condenser 28 is defrosted while the freeze dried products are being unloaded from the chamber 12. The unloading of the freeze dried products is accomplished by breaking the vacuum within the chamber 12 by opening the chamber 12 to the atmosphere through a valve 66 and opening the door 62. After the vacuum is broken within the chamber 12, a high velocity air curtain 50 is established between the condenser 28 and shelves 14.

The air curtain 50 is established just prior to defrosting condenser 28. The air curtain 50 prevents high temperature, moisture laden air evolved by the defrosting of condenser 28, from contaminating the unloading area. The unloading area will thus be maintained in a low humidity controlled environment.

The air curtain is established between a pair of ducts 48 and 52 mounted at the top and bottom of the chamber 12 respectively. A blower 46 is adapted to shoot a high velocity stream of air through the duct 48. The air enters the duct 52 in the bottom of the chamber 12 and is recirculated by means of a recirculation duct 54.

In order to decrease the refrigeration load upon the condenser 28, a radiation shield 56 is provided between the freeze drying shelves 14 and the condenser. The shield 56 will block heat radiated from the heating means 20 and the shelves 14. The shield 56 comprises a plurality of inverted V-shaped plates which block radiation but allow the sublimed water vapors to pass through them to the condenser. The shield 56 is slidably mounted on an overhead track 58 so as to afford easy access to the condenser 28 for inspection and minor maintenance.

The operation of the freeze drying apparatus 10 is substantially as follows:

Products to be freeze dried are supported upon the shelves 14 in the chamber 12. The chamber 12 is evacuated by means of the vacuum source 24.

A hot fluid is circulated through the heating coils of the heating means 20 beneath each of the shelves 14 from the hot fluid source 16. The ice which has frozen in each of the products disposed within the chamber 12 is caused to sublime and passes directly into a vapor stage. This is accomplished by adjusting the pressure within the chamber 12 and the temperature of the heating coils within the heating means 20 to a combined value wherein sublimation will take place.

The sublimed moisture will pass through the radiation shield 56 to the condensing coils of the condenser 28. After a time, ice will form and build up on the condensing coils. The shield 56 prevents heat radiated from the heating means 20 and shelves 14 from increasing the refrigeration load on the condensing coils of the condenser 28.

When the freeze drying cycle is completed, the vacuum within the chamber 12 is broken by opening the valve 66 to the atmosphere. The blower 46 is then activated to establish a high velocity air curtain 50 between the condenser 28 and door 62 leading to the chamber 12. The door 62 may then be opened and the freeze dried products removed.

A hot liquid is then applied directly from the weir 40 over the condensing coils of the condenser 28 to melt accumulated ice on the coils. The hot liquid and melted ice are collected in a drain pan 42 and removed through a drain conduit 44. The air curtain 50 prevents high temperature, moisture laden air evolved by the defrosting of condenser 28 from contaminating the unloading area. The apparatus is then ready for its next freeze drying cycle.

The hot liquid flow is stopped following the melting of the ice to avoid overheating of the condenser metal. Accumulated ice on the condenser coils is removed as a liquid and not in solid chunks.

The present invention may be embodied in other specific forms without departing from the spirit or essential attributes thereof and, accordingly, reference should be made to the appended claims, rather than to the foregoing specification as indicating the scope of the invention.

I claim:

1. Freeze drying apparatus comprising a chamber, spaced shelves supported within said chamber, vacuum producing means connected to said chamber, means associated with said shelves for heating said shelves, condenser means within said chamber for removing moisture from said chamber, means within said chamber for distributing a hot liquid over said condenser means to defrost said condenser means, and means for producing a high velocity air curtain in said chamber between said shelves and said condenser means.

2. Freeze drying apparatus comprising a chamber, spaced shelves supported within said chamber, vacuum producing means connected to said chamber, means associated with said shelves for heating said shelves, condenser means within said chamber for removing moisture from said chamber, means within said chamber for distributing a hot liquid over said condenser means to defrost said condenser means, a radiation shield between said shelves and said condenser means for preventing heat radiated by said heated shelves from reaching said condenser means, and means for producing a high velocity air curtain in said chamber between said shelves and said condenser means.

3. Freeze drying apparatus comprising a chamber, spaced shelves supported within said chamber, vacuum producing means connected to said chamber, means associated with said shelves for heating said shelves, condenser means within said chamber for removing moisture from said chamber, and means for producing a high velocity air curtain in said chamber between said shelves and said condenser means.

4. A freeze drying process comprising the steps of heating a frozen product in an evacuated chamber, causing the ice freezing said product to sublime, collecting the sublimed water vapors on a condenser, causing the collected vapors to solidify on said condenser, opening said chamber to the atmosphere adjacent said product, establishing a curtain of high velocity air between said product and said condenser, removing said product from said chamber, and defrosting said condenser.

5. A freeze drying process comprising the steps of heating a frozen product in an evacuated chamber, causing the ice freezing said product to sublime, collecting the sublimed water vapors on a condenser, shielding said establishing a curtain of high velocity air between said product and said condenser, removing said product from product and said condenser after the product has been freeze dried.

6. A freeze drying process comprising the steps of heating a frozen product in an evacuated chamber, causing the ice freezing said product to sublime, collecting the sublimed water vapors on a condenser, causing the collected vapor to solidify on said condenser, opening said chamber to the atmosphere adjacent said product, establishing a curtain of high velocity air between said product and said condenser, removing said product from said chamber, and defrosting said condenser by cascading a hot liquid over the condenser.

7. A freeze drying process comprising the steps of heating a frozen product in an evacuated chamber, causing the ice freezing said product to sublime, collecting the sublimed water vapors on a condenser, causing the collected vapors to solidify on said condenser, shielding said condenser from radiant heat during said process, opening said chamber to the atmosphere adjacent said product, establishing a curtain of high velocity air between said product and said condenser, removing said products from said chamber, and defrosting said condenser by cascading a hot liquid over said condenser.

8. A freeze drying process comprising the steps of heating a frozen product supported in an evacuated chamber, causing the ice in said product to sublime, collecting the sublimed water vapors on a condenser, causing the collected vapors to solidify on said condenser, defrosting said condenser by cascading a hot liquid over the condenser, and maintaining a curtain of air between said condenser and the support for the product while defrosting the condenser to prevent moisture laden air from passing through said curtain.

References Cited by the Examiner

UNITED STATES PATENTS

| | | | |
|---|---|---|---|
| 2,300,085 | 10/1942 | Yunker | 62—82 |
| 2,505,201 | 4/1950 | Peterson | 62—282 |
| 3,122,896 | 3/1964 | Hickey | 62—268 |
| 3,132,930 | 5/1964 | Abbott | 34—5 |
| 3,175,373 | 3/1965 | Holkeboer | 62—268 |
| 3,192,643 | 7/1965 | Rieutord | 34—5 |

WILLIAM J. WYE, *Primary Examiner.*